(12) United States Patent
Roth et al.

(10) Patent No.: US 7,483,095 B2
(45) Date of Patent: Jan. 27, 2009

(54) MULTI-PRIMARY LIQUID CRYSTAL DISPLAY

(75) Inventors: Shmuel Roth, Petach Tikva (IL); Moshe Ben-Chorin, Rehovot (IL); Doron Malka, Tel-Aviv (IL)

(73) Assignee: Genoa Color Technologies Ltd, Herzliya Pituach (IL)

( * ) Notice: Subject to any disclaimer, the term of this patent is extended or adjusted under 35 U.S.C. 154(b) by 406 days.

(21) Appl. No.: 11/009,515

(22) Filed: Dec. 13, 2004

(65) Prior Publication Data

US 2005/0134785 A1    Jun. 23, 2005

Related U.S. Application Data

(60) Provisional application No. 60/604,461, filed on Aug. 26, 2004, provisional application No. 60/529,101, filed on Dec. 15, 2003.

(51) Int. Cl.
*G02F 1/1335* (2006.01)

(52) U.S. Cl. .................. 349/106; 349/108; 349/109; 349/144; 345/690

(58) Field of Classification Search ................ 349/108, 349/106, 109, 144; 345/690
See application file for complete search history.

(56) References Cited

U.S. PATENT DOCUMENTS

| | | | |
|---|---|---|---|
| 4,390,893 A | 6/1983 | Russell et al. | |
| 4,751,535 A | 6/1988 | Myers | |
| 4,800,375 A | 1/1989 | Silverstein et al. | |
| 4,838,655 A * | 6/1989 | Hunahata et al. | 349/5 |
| 4,843,381 A | 6/1989 | Baron | |
| 4,843,573 A | 6/1989 | Taylor et al. | |
| 4,892,391 A | 1/1990 | Stewart et al. | |
| 4,985,853 A | 1/1991 | Taylor et al. | |
| 5,042,921 A * | 8/1991 | Sato et al. | 349/9 |
| 5,214,418 A | 5/1993 | Fukumura et al. | |
| 5,416,890 A | 5/1995 | Beretta | |
| 5,455,600 A | 10/1995 | Friedman et al. | |
| 5,592,188 A | 1/1997 | Doherty et al. | |

(Continued)

FOREIGN PATENT DOCUMENTS

EP    0 367 848    5/1990

(Continued)

OTHER PUBLICATIONS

International Search Report for PCT/IL04/01123, mailed Jan. 5, 2006.

(Continued)

*Primary Examiner*—David C. Nelms
*Assistant Examiner*—Thanh-Nhan P Nguyen
(74) *Attorney, Agent, or Firm*—Pearl Cohen Zedek Latzer, LLP

(57) ABSTRACT

Embodiments of the invention include a method, device and/or system for displaying a color image having a plurality of more-than-three primary color pixels The device may include, for example, an array of sub-pixel elements of at least four different primary colors, wherein the total number of sub-pixel elements in the array is significantly smaller than a multiplication product of the number of more-than-three-primary color pixels in the image multiplied by the number of the at least four different primary colors. Other embodiments are described and claimed.

50 Claims, 5 Drawing Sheets

U.S. PATENT DOCUMENTS

| | | | |
|---|---|---|---|
| 5,642,176 A | 6/1997 | Abukawa et al. | |
| 5,650,942 A | 7/1997 | Granger | |
| 5,724,062 A | 3/1998 | Hunter | |
| 5,751,385 A | 5/1998 | Heinze | |
| 5,844,540 A | 12/1998 | Terasaki | |
| 5,863,125 A | 1/1999 | Doany | |
| 5,870,530 A | 2/1999 | Balasubramanian | |
| 5,872,898 A | 2/1999 | Mahy | |
| 5,892,891 A | 4/1999 | Dalal et al. | |
| 5,982,347 A | 11/1999 | Shigeta et al. | |
| 5,999,153 A | 12/1999 | Lind et al. | |
| 6,018,237 A | 1/2000 | Havel | |
| 6,023,315 A * | 2/2000 | Harrold et al. | 349/108 |
| 6,040,876 A | 3/2000 | Pettitt et al. | |
| 6,054,832 A | 4/2000 | Kunzman et al. | |
| 6,069,601 A | 5/2000 | Lind et al. | |
| 6,097,367 A | 8/2000 | Kuriwaki et al. | |
| 6,191,826 B1 | 2/2001 | Murakami et al. | |
| 6,198,512 B1 | 3/2001 | Harris | |
| 6,246,396 B1 | 6/2001 | Gibson et al. | |
| 6,259,430 B1 | 7/2001 | Riddle et al. | |
| 6,262,710 B1 | 7/2001 | Smith | |
| 6,262,744 B1 | 7/2001 | Carrein | |
| 6,280,034 B1 | 8/2001 | Brennesholtz | |
| 6,453,067 B1 | 9/2002 | Morgan et al. | |
| 6,580,482 B1 | 6/2003 | Hiji et al. | |
| 6,594,387 B1 | 7/2003 | Pettitt et al. | |
| 6,980,176 B2 * | 12/2005 | Matsumoto et al. | 345/6 |
| 7,139,058 B2 * | 11/2006 | Son et al. | 349/141 |
| 7,362,393 B2 * | 4/2008 | Kim et al. | 349/106 |
| 2002/0109821 A1 | 8/2002 | Huibers et al. | |
| 2002/0122019 A1 | 9/2002 | Baba et al. | |
| 2002/0149546 A1 | 10/2002 | Ben-Chorin et al. | |
| 2002/0186229 A1 | 12/2002 | Brown Elliot | |
| 2002/0191130 A1 * | 12/2002 | Liang et al. | 349/108 |
| 2003/0085906 A1 | 5/2003 | Elliott et al. | |
| 2003/0117423 A1 * | 6/2003 | Brown et al. | 345/690 |
| 2003/0160915 A1 | 8/2003 | Liu | |
| 2004/0046725 A1 | 3/2004 | Lee | |
| 2004/0174389 A1 * | 9/2004 | Ben-David et al. | 345/694 |
| 2005/0140636 A1 | 6/2005 | Chung et al. | |
| 2005/0162358 A1 | 7/2005 | Song et al. | |
| 2005/0270444 A1 * | 12/2005 | Miller et al. | 349/108 |

FOREIGN PATENT DOCUMENTS

| | | |
|---|---|---|
| JP | 60263122 | 12/1985 |
| JP | 09251160 | 9/1997 |
| JP | 10307205 | 11/1998 |
| JP | 2000253263 | 9/2000 |
| JP | 2000338950 | 12/2000 |
| JP | 2002149148 | 5/2002 |
| WO | WO 95/10160 | 4/1995 |
| WO | WO 97/42770 | 11/1997 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | WO 02/099557 | 12/2002 |
| WO | WO 02/101644 | 12/2002 |
| WO | WO 03/088203 | 10/2003 |

OTHER PUBLICATIONS

U.S. Appl. No. 09/710,895, filed Nov. 14, 2000, Ben David et al.

"A critical view of Spectral Models Applied to Binary Color Printing", Wyble and Berns, Color Research and Application, vol. 25, 2000, pp. 4-19.

Rosen et al., "Spectral Reproduction from Scene to Hardcopy II", Image Processing, Munsell Color Science Laboratory, RIT-Proceedings of SPIE vol. 4300 (2001).

Pointer, M. R., "The Gamut of Real Surface Colors", Color Research & Appl. 5(3): 145-155, 1980.

Ajito et al., Expanded Color Gamut Reproduced by Six-Primary Projection Display, Proc. SPIE, vol, 2954 (2000) pp. 130-137.

Ajito et al., "Multiprimary Color Display for Liquid Crystal Display Projectors Using Diffraction Granting", Optical Eng. 38(11) 1883-1888 (Nov. 1999).

Ajito et al., "Color Conversion Method for Multiprimary Display Using Matrix Switching", Optical Review, vol. 9, No. 3 (Dec. 2001), 191-197.

Gunter Wyszecki and W.S. Stiles, Color Science: Concepts and methods, Quantative Data and Formulae, 2d Ed., 1982, pp. 179-183.

Betrisey et al., "20.4: Displaced Filtering for Patterned Displays", Microsoft Corporation, Society for Information Display, 2000, SID, pp. 1-4.

Daly, Scott, "47.3: Analysis of Subtriad Addressing Algorithms by Visoal System Models" Center for Displayed Appearance, Sharp Laboratories of America, Camas, WA, USA, 2001, SID, pp. 1200-1203.

Klompenhouwer et al., "13.4: Subpixel Image Scaling for Color Matrix Displays", Phillips Research Laboratories, Einhoven, The Netherlands, 2002, SID pp. 176-179.

Credelle et al., "9-2: MTF of High-Resolution Pen Tile Matrix Displays", Eurodisplay 2002, pp. 159-162.

Hiyama et al., "LN-3: Four-Primary Color 15-in. XGA TFT-LCD with Wide Color Gamut", Japan, Eurodisplay 2002, pp. 827-830.

Sugiura et al., "P-24: LCD Module Adopting a Color Conversion Circuit", Japan, SID, 2002, pp. 288-291.

Elliott et al., "Color Subpixel Rendering Projectors and Flat Panel Displays", SMPTE Advanced Motion Imaging Conference, Feb. 27-Mar. 1, 2003, Seattle, Washington, USA, pp. 1-4.

Yamada et al., "12.1: LED Backlight for LCDs", IBM Research, Tokyo Research Laboratory, Yamato, Japan, 1998, SID, pp. 1-4.

Sugiura, T., "11.4: Invited Paper: EBU Color Filter for LCDs", Toppan Printing Co., Japan, SID, 2001, pp. 146-149.

* cited by examiner

MULTI-PRIMARY LIQUID CRYSTAL DISPLAY

CROSS-REFERENCE TO RELATED APPLICATIONS

This application claims the benefit of U.S. Provisional Patent Application, 60/529,101, filed Dec. 15, 2003 and the benefit of U.S. Provisional Patent Application, 60/604,461, filed Aug. 26, 2004, the disclosures of both of which are incorporated herein by reference in their entirety.

FIELD OF THE INVENTION

The invention relates generally to multi-primary color displays and, more particularly, to multi-primary Liquid Crystal Displays (LCDs)

BACKGROUND

A Liquid Crystal Display device includes an array of Liquid Crystal (LC) elements, which may be driven, for example, by one or more Thin Film Transistor (TFT) elements. In some LCD devices, the LC array may include a plurality of column line drivers and a plurality of row line drivers to allow controlling each element of the LC array.

The TFTs, the row line drivers and the column line drivers may block part of the light provided to the LC array, and consequently reduce the level of brightness of the display. Thus, it may be desired to reduce the amount of light blocked by the TFTs, the row line drivers and the column line drivers. Furthermore, it may be desired to reduce the number of the TFTs, the row line drivers and/or the column line drivers in order to reduce the cost of the display.

SUMMARY OF EMBODIMENTS OF THE INVENTION

Embodiments of the invention include a method, device and/or system for displaying a color image having a plurality of more-than-three primary color pixels.

According to some exemplary embodiments of the invention, the device may include, for example, an array of sub-pixel elements of at least four different primary colors, wherein the total number of sub-pixel elements in the array may be significantly smaller than a multiplication product of the number of more-than-three-primary color pixels in the image multiplied by the number of the at least four different primary colors.

According to some exemplary embodiments of the invention, the color display device may include an array of sub-pixel elements of at least four different primary colors arranged in at least first and second repeatable color sequences of sub-pixel elements of at least three primary colors, wherein the first color sequence may include at least one sub-pixel element of a primary color not included in the second sequence, and/or the second color sequence may include at least one sub-pixel element of a primary color not included in the first sequence.

According to some exemplary embodiments of the invention, the sub-pixel elements of the array are may be arranged in a repeatable pattern including sub-pixel elements of each of the at least four primary colors. The pattern may include, for example, less sub-pixel elements of a first primary color than sub-pixel elements of a second primary color.

According to some exemplary embodiments of the invention, the color display device may include a controller able to selectively activate at least some sub-pixel elements of the array to produce one or more attenuation patterns based on sub-pixel data representing pixels of the color image.

According to some exemplary embodiments of the invention, sub-pixel elements of the first and second color sequences may be activated based on sub-pixel data corresponding to at least first and second pixels of the color image. For example, at least one sub-pixel element of at least one of the first and second sequences may be activated, based on a value determined by a combination of sub-pixel data of the at least first and second pixels.

According to some exemplary embodiments, the at least one sub-pixel element to be activated may include, for example, the sub-pixel element of the primary color not included in the second sequence, and the sub-pixel data may include sub-pixel data of the at least first and second pixels corresponding to the primary color not included in the second sequence.

According to some exemplary embodiments, a sub-pixel element of the second sequence may be activated, for example, based on a value determined by a combination of sub-pixel data of the sub-pixel element to be activated and the primary color not included in the second sequence.

According to some exemplary embodiments of the invention, a first sub-pixel element of the second sequence may be activated based on a value determined by a combination of sub-pixel data of the second pixel corresponding to the primary color of the first sub-pixel element, and a first correction component; a second sub-pixel element of the second sequence may be activated based on a value determined by a combination of sub-pixel data of the second pixel corresponding to the primary color of the second sub-pixel element, and a second correction component; and/or the sub-pixel element of the primary color not included in the second sequence may be activated based on a value determined by a combination of sub-pixel data of the first pixel corresponding to the primary color not included in the second sequence, and a third correction component.

BRIEF DESCRIPTION OF THE DRAWINGS

The invention will be understood and appreciated more fully from the following detailed description of embodiments of the invention, taken in conjunction with the accompanying drawings of which.

Figure 1:
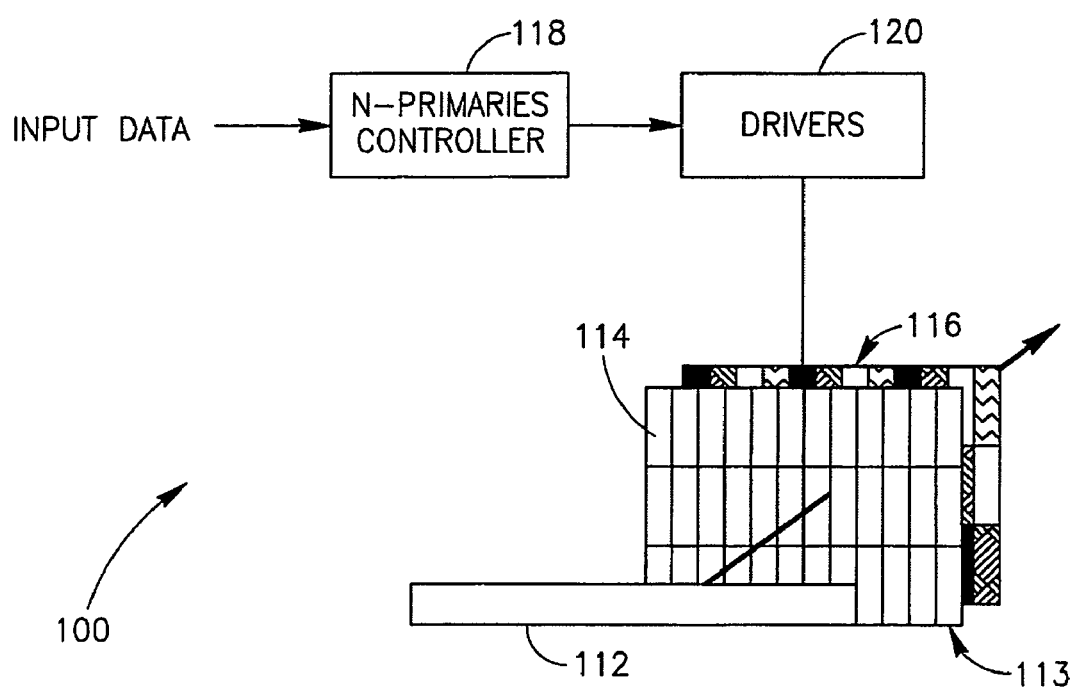
FIG. 1 is a schematic illustration of a more-than-three primary color display system in accordance with exemplary embodiments of the invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Embodiments of monitors and display devices with more than three primaries, in accordance with exemplary embodiments of the invention, are described in International Application PCT/IL02/00452, filed Jun. 11, 2002, entitled "DEVICE, SYSTEM AND METHOD FOR COLOR DISPLAY" and published 19 Dec. 2002 as PCT Publication WO 02/101644, the disclosure of which is incorporated herein by reference.

Reference is made to FIG. 1, which schematically illustrates a more-than-three primary color display system 100 in accordance with exemplary embodiments of the invention.

According to exemplary embodiments of the invention, system 100 may include a light source 112, and an array of sub-pixel elements. For example, system 100 may include an array 113 of liquid crystal (LC) elements (cells) 114, for example, an LC array using Thin Film Transistor (TFT) active-matrix technology, as is known in the art; and an n-primary-color filter array 116, wherein n is greater than three, which may be, for example, juxtaposed to array 113. System 100 may include any other suitable configuration of sub-pixel elements. System 100 may further include electronic circuits 120 ("drivers") for driving the cells of array 113, e.g., by active-matrix addressing, as is known in the art, According to some exemplary embodiments of the invention, a pixel of a color image may be reproduced by sub-pixel elements of more than three primary colors, wherein each sub-pixel element corresponds to one of the n primary colors. Back-illumination source 112 provides the light needed to produce the color images. The transmittance of each of the sub-pixel elements may be controlled, for example, by the voltage applied to a corresponding LC cell of array 113, based on image data input for one or more corresponding pixels, as described below. An n-primaries controller 118 may be able to receive the image data including sub-pixel data representing pixels of the color image, and to selectively activate at least some of the sub-pixel elements of array 113 to produce an attenuation pattern based on the sub-pixel data. For example, controller 118 may receive the input data, e.g., in Red (R), Green (G), and Blue (B) or YCbCr format, optionally scale the data to a desired size and resolution, and adjust the magnitude of the signal delivered to the different drivers based on the input data. Controller 118 may be able to convert input image data, e.g., data including RGB image components or YCbCr data of a pixel, into sub-pixel data of more than three primary colors, e.g., R, G, B, Yellow (Y), and Cyan (C). The intensity of white light provided by back-illumination source 112 may be spatially modulated by elements of the LC array, selectively controlling the illumination of each sub-pixel element according to the image data for one or more pixels, as described below. The selectively attenuated light of each sub-pixel passes through a corresponding color filter of color filter array 116, thereby producing desired color sub-pixel combinations. The human vision system spatially integrates the light filtered through the different color sub-pixel elements to perceive a color image.

An aperture ratio of a LCD display may be defined as the ratio between the net area of the display and the overall area of the display, wherein the net area of the display is defined as the overall area of the display excluding a total area of blocking, e.g., a total of areas of the display "blocked" by TFTs and the column and row driver lines, as is known in the art. For example, the total area of blocking of a display including l rows of mi sub-pixel elements, wherein each sub-pixel element includes one TFT, wherein each row includes one row driver line, and wherein each column includes one column driver, may be calculated as follows:

$$m*L_{column}*t_{column}+l*L_{row}*t_{row}+l*m*S_{tft} \quad (1)$$

wherein $S_{tft}$ denotes the blocking area of each TFT, $L_{row}$ and $t_{row}$ denote the length and width of each row driver line, respectively, and $L_{column}$ and $t_{column}$ denote the length and width of each column driver line, respectively. Accordingly, the overall area of the display may be approximately $L_{column}*L_{row}$, and the aperture ratio of the display may be calculated assuming an aspect ratio $AR=L_{row}/L_{column}$.

It will be appreciated by those skilled in the art that a higher total area of blocking may correspond to a lower brightness level of the display, since a larger amount of the light provided to the display is blocked by the TFTs and/or driver lines.

According to some exemplary embodiments of the invention, system 100 may be implemented for reproducing a color image having a plurality of more-than-three primary color pixels, using an array of sub-pixel elements of at least four different primary colors, wherein the total number, denoted $S_T$, of sub-pixel elements in the array is significantly smaller than a product P=s*n, wherein s denotes the number of more-than-three-primary color pixels in the image, and wherein n denotes the number of the at least four different primary colors, as described in detail below. For example, the number of sub-pixel elements in the array as a fraction of the product P may be related to the number of the four or more primary colors. The array may include, for example, sub-pixel elements arranged in at least one repeatable color sequence of sub-pixel elements of at least three primary colors, and the total number of sub-pixel elements in the array as a fraction of the product P may be equal to approximately the number of sub-pixel elements in the color sequence divided by the number of the four or more primary colors, as described below.

The human vision system may perceive different primary colors in different levels of spatial resolution. For example, the human vision may perceive some primary colors, e.g., blue and cyan, in a substantially lower level of spatial resolution in comparison to the perceived spatial resolution level of other primary colors, e.g., green, yellow and red. Thus, according to embodiments of the invention, some of the primary colors, e.g., blue and/or cyan, may be displayed in a lower spatial resolution, e.g., using a smaller number of sub-pixel elements, as compared to other primary colors, e.g., red, green and/or yellow, without significantly affecting the overall resolution of the color image perceived by the human vision system, as described below.

According to exemplary embodiments of the invention, the sub-pixel elements of array 113 may be arranged in a predetermined configuration including a predetermined repeatable pattern including a predetermined, fixed, number of sub-pixel elements, each corresponding to one of the ii primary colors. For example, array 113 may include sub-pixel elements of at least four different primary colors arranged in at least first and second repeatable color sequences of sub-pixel elements of at least three primary colors, wherein the first color sequence includes at least one sub-pixel element of a primary color not included in the second sequence, as described below. Accordingly, the pattern may include a smaller number of sub-pixel elements corresponding to one or more predetermined primary colors compared to the number of sub-pixel elements corresponding to other primary colors. According to some of these exemplary embodiments, drivers 120 of some of the sub-pixel elements, e.g., the drivers of sub-pixel elements corresponding to the one or more predetermined primary colors, may be provided with a value corresponding to a combination of sub-pixel data of more than one pixel, as described below. This manipulation of image data may be performed, for example, by controller 118.

Figure 2:
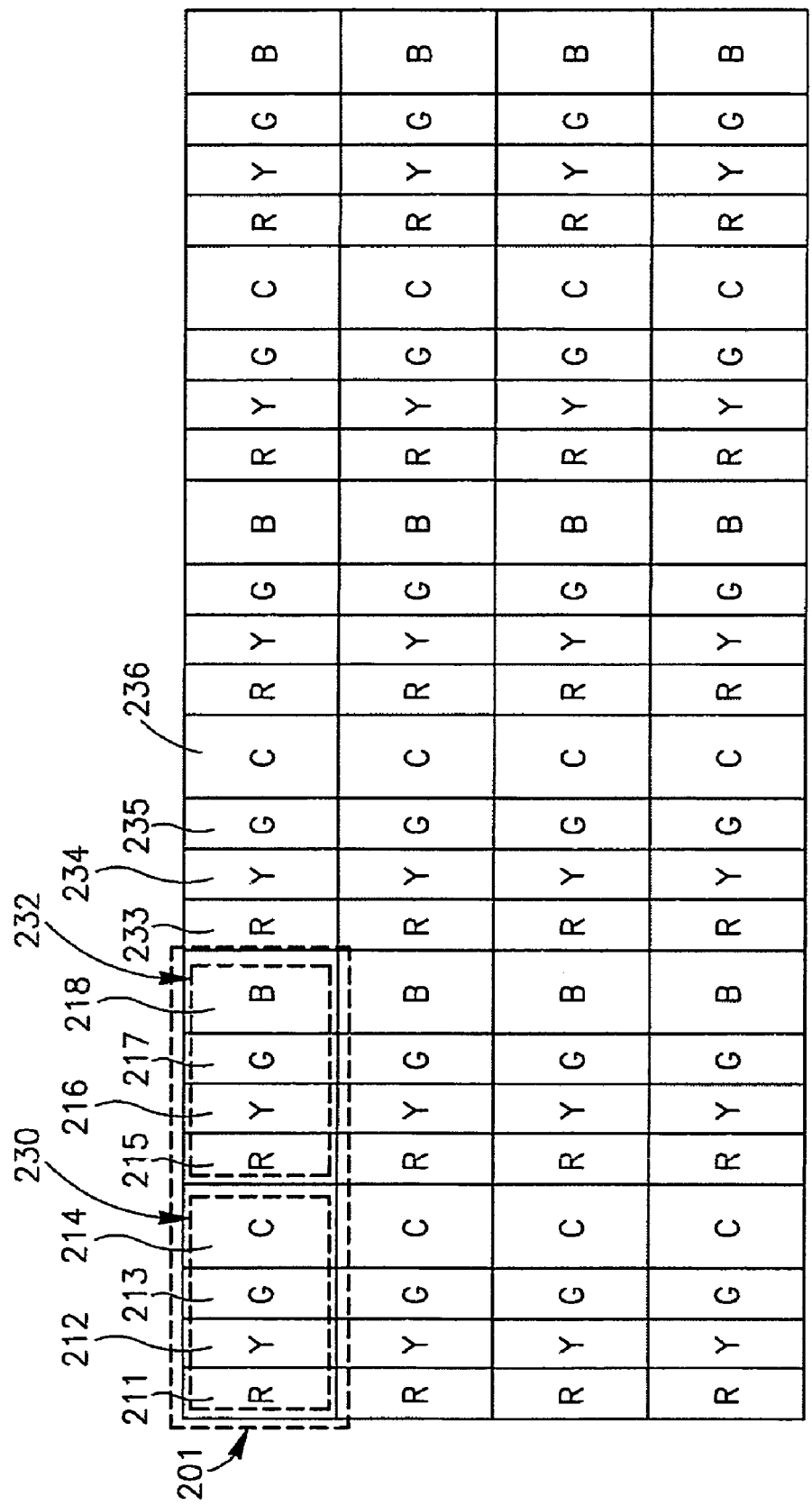
FIG. 2 is a schematic illustration of a sub-pixel configuration including a repeatable pattern of sub-pixel elements, in accordance with one exemplary embodiment of the invention.

Reference is made to FIG. 2, which schematically illustrates a configuration 200 of sub-pixel elements in a five-primary display device including a repeatable pattern 201, in accordance with one exemplary embodiment of the invention.

Pattern 201 may include sub-pixel elements corresponding to five primary colors, e.g., red, yellow, green, cyan and blue, arranged in a row including eight sub-pixel elements.

According to an exemplary embodiment, pattern 201 may include a smaller number of sub-pixel elements corresponding to each of the blue and cyan primary colors in comparison to the number of sub-pixel elements corresponding to each of the red, green and yellow primary colors, as described below.

Pattern 201 may include two sub-pixel elements, e.g., sub-pixel elements 211 and 215, corresponding to the red primary color, two sub-pixel elements, e.g., sub-pixel elements 212 and 216, corresponding to the yellow primary color, two sub-pixel elements, e.g., sub-pixel elements 213 and 217, corresponding to the green primary color, one sub-pixel element, e.g., sub-pixel element 214 corresponding to the cyan primary color, and one sub-pixel element, e.g., sub-pixel element 218, corresponding to the blue primary color.

According to this exemplary embodiment, configuration 200 may include sub-pixel elements arranged in at least first and second repeatable color sequences, e.g., color sequences 230 and 232. Sequence 230 may include at least one sub-pixel element, e.g., element 214, of a primary color, e.g., cyan, not included in sequence 232. Sequence 232 may include at least one sub-pixel element, e.g., element 218, of a primary color, e.g., blue, not included in sequence 230.

According to this exemplary embodiment, sequences 230 and 232 may each include sub-pixel elements of a predetermined sub-sequence of some of the primary colors, for example, a red-yellow-green sub-sequence. According to other embodiments of the invention one or more of the repeatable color sequences may include any other predetermined sub-color sequence.

According to some exemplary embodiments of the invention, each pixel of the color image may be reproduced by one or more sub-pixel elements of configuration 200. For example, a first pixel of the color image may be reproduced by sub-pixel elements 214, 215, 216, 217, and/or 218; and a second pixel, e.g., adjacent to the first pixel, may be reproduced by sub-pixel elements 218, 233, 234, 235 and/or 236. According to some embodiments of the invention, one or more sub-pixel elements of configuration 200, for example, sub-pixel elements corresponding to the blue and/or cyan primary colors, e.g., sub-pixel elements 214 and/or 218, may be activated based on a value determined by a combination of sub-pixel data corresponding to two or more pixels of the color image. Other sub-pixel elements of configuration 200, for example, sub-pixel elements corresponding to the green, red and/or yellow primary colors, e.g., sub-pixel elements 211, 212, 213, 215, 216, 217, 233, 234 and/or 235, may be activated based on sub-pixel data corresponding to one or more pixels. For example, one or more drivers, e.g. of drivers 120 (FIG. 1), of a sub-pixel element corresponding to one or more of the red, green or yellow primary colors, respectively, may be provided with a value corresponding to red, green and yellow sub-pixel data, respectively, of one or more pixels. This data arrangement may be provided by controller 118 (FIG. 1). A driver, e.g. of drivers 120 (FIG. 1), of a sub-pixel element corresponding to a primary color not included in one of sequences 230 and 232 may be provided with a value determined by a combination of sub-pixel data of two or more pixels. For example, a driver of a sub-pixel element corresponding to the cyan primary color may be provided with a value determined by a combination, e.g., an arithmetic average, a weighted average and/or any other suitable combination, of cyan sub-pixel data of two or more pixels. A driver, e.g. of drivers 120 (FIG. 1), of a sub-pixel element corresponding to a blue sub-pixel may be provided, for example, with a value determined by a combination, e.g., an arithmetic average, a weighted average and/or any other suitable combination, of blue sub-pixel data of two or more pixels. The two or more pixels may include, for example, two or more neighboring pixels, e.g., two or more vertically, horizontally and/or diagonally adjacent pixels, or any other two or more pixels of the color image. Thus, it will be appreciated by those skilled in the art that since the sub-pixel elements of pattern 201 may be activated to reproduce two pixels, the size of an effective pixel corresponding to configuration 200 ("the effective pixel size") may be equal to half the sum of the areas of the sub-pixel elements of pattern 201. Controller 118 (FIG. 1) may rearrange the sub-pixel data to provide the desired sequences of values to drivers 120.

According to exemplary embodiments of the invention, the size of some of the sub-pixel elements may be different than the size of other sub-pixel elements in order to achieve a desired white balance of the display. For example, the area covered by each sub-pixel element corresponding to the blue and/or the cyan primaries may be larger than the area covered by each sub-pixel element corresponding to the red, yellow and/or green primaries.

It will be appreciated by those skilled in the art that a display system, e.g., system 100 (FIG. 1), implementing configuration 200 for reproducing a color image including l rows of s 5-primary pixels, may include 4*s column driver lines and l row driver lines. Such a display may also include 4*s*l TFTs, e.g., one TFT located on each sub-pixel element. Accordingly, a total blocking area of such a display may be equal to:

$$4*s*L_{column}*t_{column}+l*L_{row}*t_{row}+4*l*s*S_{tft} \quad (2)$$

It will be appreciated by those skilled in the art that a display according to the exemplary embodiments described above, may include a smaller number of column driver lines and a smaller number of TFTs compared to the number of column driver lines, e.g., 5*s, and the number of TFTs, e.g., 5*s*l, of other 5-primary display systems, e.g., wherein sub-pixel elements of five primary colors are used for reproducing each pixel. Consequently, a display according to the exemplary embodiments described above, may also have a relatively smaller total blocking area resulting in a higher brightness level, compared to the total blocking area, e.g., $5*s*L_{column}*t_{column}+1*L_{row}*t_{row}+5*1*s*S_{tft}$, and the resulting brightness level of other 5-primary display systems. For example, a 1280×720 display having a 16:9 aspect ratio, i.e., s=1280, l=720 and $L_{row}=16/9*L_{column}$, may have an aperture ratio of approximately 70%, i.e., a total area of blocking of approximately 30%, if sub-pixel elements of five primary colors are used for reproducing each pixel. Assuming the total area of blocking includes 6% TFT blocking, and 24% driver lines blocking, and assuming $t_{row}=t_{column}$, it will be appreciated by those skilled in the art that implementing sub-pixel arrangement 200 may reduce the TFT blocking to approximately 5%, and the driver line blocking to approximately 20%. Accordingly, the aperture ratio of such a display implementing arrangement 200 may be increased by approximately 5%, e.g. to an approximate value of 75%. Furthermore, implementing sub-pixel arrangement 200 may reduce the number of column drivers by approximately 20%, which may result in a reduction in a data rate required for activating the sub-pixel elements of pattern 200

It will be appreciated by those skilled in the art that according to other embodiments of the invention, any other suitable pattern of sub-pixel elements, e.g., including any suitable two or more repeatable color sequences, may be implemented by display system 100 (FIG. 1) to form a sub-pixel configuration similar to configuration 200, e.g., as described below.

Figure 3B:
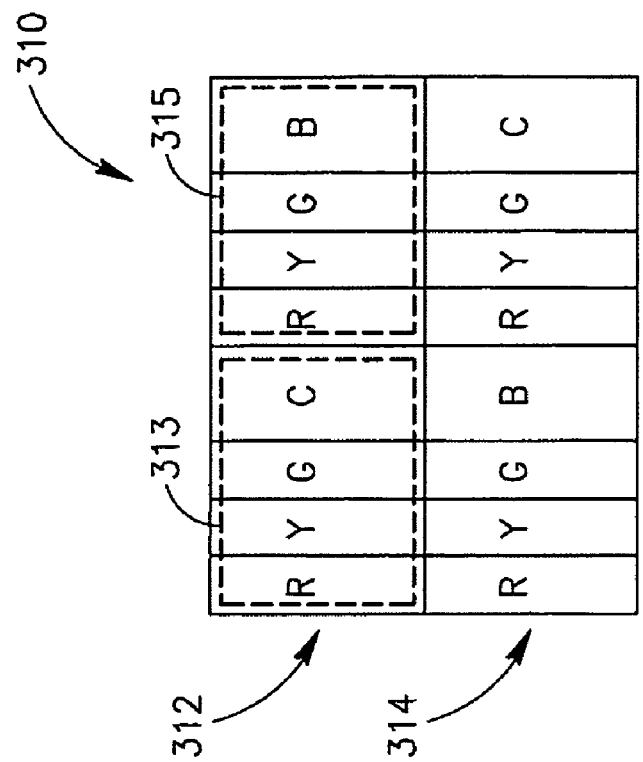
FIGS. 3A and 3B are schematic illustrations of a first 5-primary pattern of sub-pixel elements and a second 5-primary pattern of sub-pixel elements, respectively, which may be implemented to form sub-pixel configurations in accordance with other exemplary embodiments of the invention.
Figure 3A:
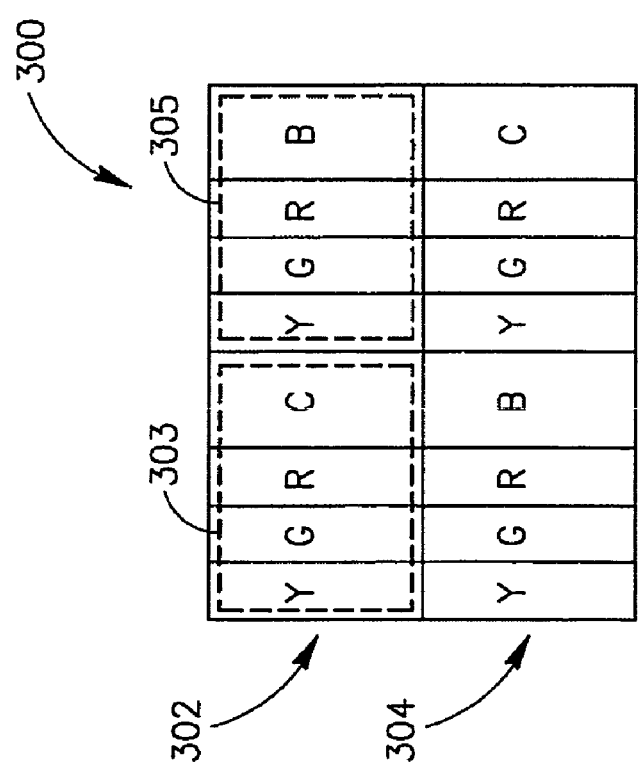

Reference is also made to FIGS. 3A and 3B which schematically illustrate a first 5-primary pattern 300 of sub-pixel elements and a second 5-primary pattern 310 of sub-pixel elements, respectively, which may be implemented to form configuration 200 according to other exemplary embodiments of the invention.

Pattern 300 may include two different rows, e.g., row 302 and row 304. Row 302 may include sub-pixel elements arranged, for example, in the order "yellow-green-red-cyan-yellow-green-red-blue". Row 304 may include sub-pixel elements arranged, for example, in the order "yellow-green-red-blue-yellow-green-red-cyan". Accordingly, pattern 300 may include a first color sequence 303, e.g., including sub-pixels elements of the primary colors "yellow-green-red-cyan", and a second color sequence 305, e.g., including sub-pixels elements of the primary colors "yellow-green-red-blue".

Pattern 310 may include two different rows, e.g., row 312 and row 314. Row 312 may include sub-pixel elements arranged, for example, in the order "red-yellow-green-cyan-red-yellow-green-blue". Row 314 may include sub-pixel elements arranged, for example, in the order "red-yellow-green-blue-red-yellow-green-cyan". Accordingly, pattern 310 may include a first color sequence 313, e.g., including sub-pixels elements of the primary colors "red-yellow-green-cyan", and a second color sequence 315, e.g., including sub-pixels elements of the primary colors "red-yellow-green-blue". According to other embodiments of the invention pattern 300 and/or pattern 310 may include any other suitable configuration of sub-pixel elements.

It will be appreciated by those skilled in the art that a pattern, e.g., pattern 300 or pattern 310, wherein the location of the cyan and blue primary colors is interchanged along the columns, may be implemented to achieve a more uniform color distribution across the display.

According to some embodiments of the invention, an effective pixel of the color image may be reproduced by sub-pixel elements of more than one row, as described below.

Figure 4:
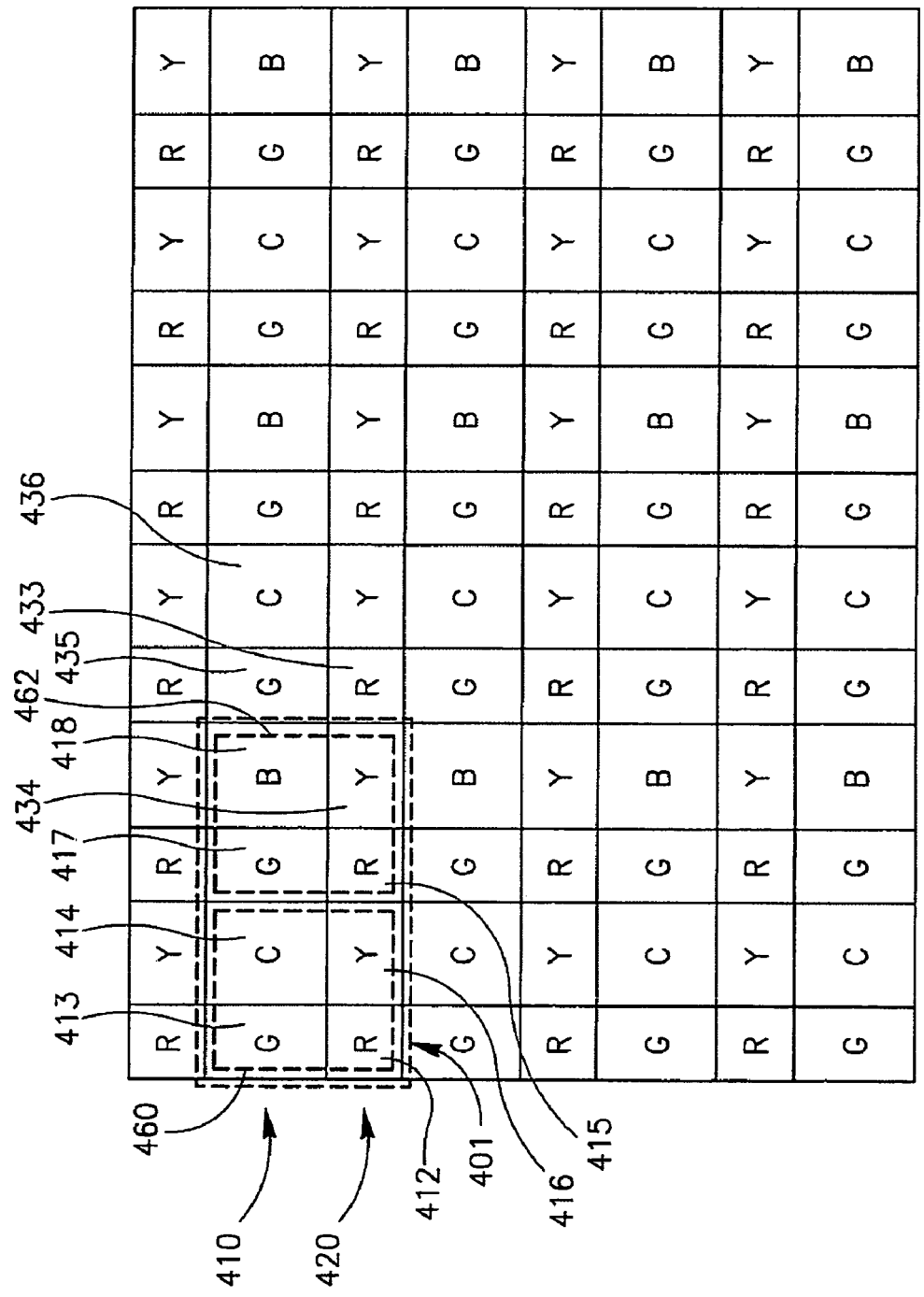
FIG. 4 is a schematic illustration of a sub-pixel configuration including a repeatable pattern of sub-pixel elements, in accordance with yet another exemplary embodiment of the invention.

Reference is made to FIG. 4, which schematically illustrates a configuration 400 of sub-pixel elements in a five-primary display device including a repeatable pattern 401, in accordance with another exemplary embodiment of the invention.

Pattern 401 may include sub-pixel elements corresponding to five primary colors, e.g., red, yellow, green, cyan and blue, arranged in two adjacent rows, e.g., rows 410 and 420.

According to an exemplary embodiment, pattern 401 may include a smaller number of sub-pixel elements corresponding to each of the blue and cyan primary colors in comparison to the number of sub-pixel elements corresponding to each of the red, green and yellow primary colors, as described below.

Row 420 may include four sub-pixel elements 412, 416, 415, and 434 corresponding to the primary colors red, yellow, red and yellow, respectively. Row 410 may include four sub-pixel elements 413, 414, 417, and 418 corresponding to the primary colors green, cyan, green and blue, respectively.

According to this exemplary embodiment, the sub-pixel elements of pattern 401 may be arranged in at least first and second repeatable color sequences, e.g., color sequences 460 and 462. Sequence 460 may include at least one sub-pixel element, e.g., element 414, of a primary color, e.g., cyan, not included in sequence 462. Sequence 462 may include at least one sub-pixel element, e.g., element 418, of a primary color, e.g., blue, not included in sequence 460.

According to this exemplary embodiment, sequences 460 and/or 462 may include sub-pixel elements of a predetermined sub-sequence of some of the primary colors, for example, a red-yellow-green sub-sequence.

According to some exemplary embodiments of the invention, each pixel of the color image may be reproduced by one or more sub-pixel elements of configuration 400. For example, a first pixel of the color image may be reproduced by sub-pixel elements 416, 415, 414, 417 and/or 418; and a second pixel, e.g., adjacent to the first pixel, may be reproduced by sub-pixel elements 434, 418, 433, 435 and/or 436. According to some embodiments of the invention, one or more sub-pixel elements of configuration 400, for example, sub-pixel elements corresponding to the blue and/or cyan primary colors, e.g., sub-pixel elements 414 and/or 418, may be activated based on a value determined by a combination of sub-pixel data corresponding to two or more pixels of the color image. Other sub-pixel elements of configuration 400, for example, sub-pixel elements corresponding to the green, red and/or yellow primary colors, e.g., sub-pixel elements 416, 415, 417, 434, 435 and/or 433, may be activated based on sub-pixel data corresponding to one or more pixels. For example, one or more drivers, e.g. of drivers 120 (FIG. 1), of a sub-pixel element corresponding to one or more of the red, green and/or yellow primary colors, respectively, may be provided a value corresponding to red, green and/or yellow sub-pixel data, respectively, of one or more pixels. This data arrangement may be provided by controller 118 (FIG. 1). A driver, e.g. of drivers 120 (FIG. 1), of a sub-pixel element corresponding to the cyan primary color may be provided with a value determined by a combination, e.g., an arithmetic average, a weighted average and/or any other suitable combination, of cyan sub-pixel data corresponding to two or more pixels A driver, e.g. of drivers 120 (FIG. 1), of a sub-pixel element corresponding to a blue sub-pixel may be provided with a value determined by a combination, e.g., an arithmetic average a weighted average and/or any other suitable combination, of blue sub-pixel data corresponding to two or more pixels. The two or more pixels may include, for example, two or more neighboring pixels, e.g., two or more vertically, horizontally and/or diagonally adjacent pixels, or any other two or more pixels of the color image. Thus, it will be appreciated by those skilled in the art that since the sub-pixel elements of pattern 401 may be activated to reproduce two pixels, the effective pixel size corresponding to configuration 400 may be equal to half the sum of the areas of the sub-pixel elements of pattern 401. Controller 118 (FIG. 1) may rearrange the sub-pixel data to provide die desired sequences of values to drivers 120.

According to exemplary embodiments of the invention, the size of some of the sub-pixel elements may be different from the size of other sub-pixel elements in order to achieve a desired white balance of the displayed image. For example, the area of each sub-pixel element corresponding to the blue and/or the cyan primaries may be larger than the area of each sub-pixel element corresponding to the red, yellow and/or green primaries.

It will be appreciated by those skilled in the art, that a display system, e.g., system 100 (FIG. 1), implementing configuration 400 for reproducing a color image including l rows of s 5-primary pixels, may include 2*s column driver lines and 2*l row driver lines. Such a display may also include 4*s*l TFTs, e.g., one TFT located on each sub-pixel element. Accordingly, a total blocking area of such a display may be equal to:

$$2*s*L_{column}*t_{column}+2*l*L_{row}*t_{row}4*l*s*S_{tft} \quad (3)$$

It will be appreciated by those skilled in the art that the over-all cost of driver lines of a 5-primary display implementing configuration 400 may be lower compared to the cost of driver lines of a conventional 3-primary LCD display, e.g., a display including 3*s column driver lines and l row driver lines, because the cost of a column driver line is generally higher than the cost of a row driver line. It will also be appreciated by those skilled in the art, that tie over-all cost of a 5-primary display implementing configuration 400 may be lower compared to the over-all cost of some four-primary displays, wherein sub-pixel elements of four or five primaries are used for reproducing each pixel, and of some five-primary displays, wherein sub-pixel elements of five primary colors are used for reproducing each pixel.

It will further be appreciated by those skilled in the art that a display according to the exemplary embodiments described above may have a total blocking area of $2*s*L_{column}*t_{column}+2*l*L_{row}*t_{row}*4*l*s*S_{tft}$, compared to the total blocking area of a conventional 3-primary LCD display, e.g., $3s*L_{column}*t_{column}+l*L_{row}*t_{row}+3*l*s*S_{tft}$. Furthermore, if $L_{row}=16/19*L_{column}$, s=1280, and l=720, an aperture ratio of approximately 78% may be achieved if configuration 400 is implemented, which is higher than the achievable aperture ratio, e.g., 75%, corresponding to configuration 200, which in turn is higher than the achievable aperture ratio, e.g., 70%, corresponding to a five-primary display wherein sub-pixel elements of five primary colors are used for reproducing each pixel.

It will be appreciated by those skilled in the art that according to other embodiments of the invention, any other suitable pattern of sub-pixel elements, e.g., including any suitable two or more repeatable color sequences, may be implemented by display system 100 (FIG. 1) to form a configuration similar to configuration 400, e.g., as described below.

Figure 5:
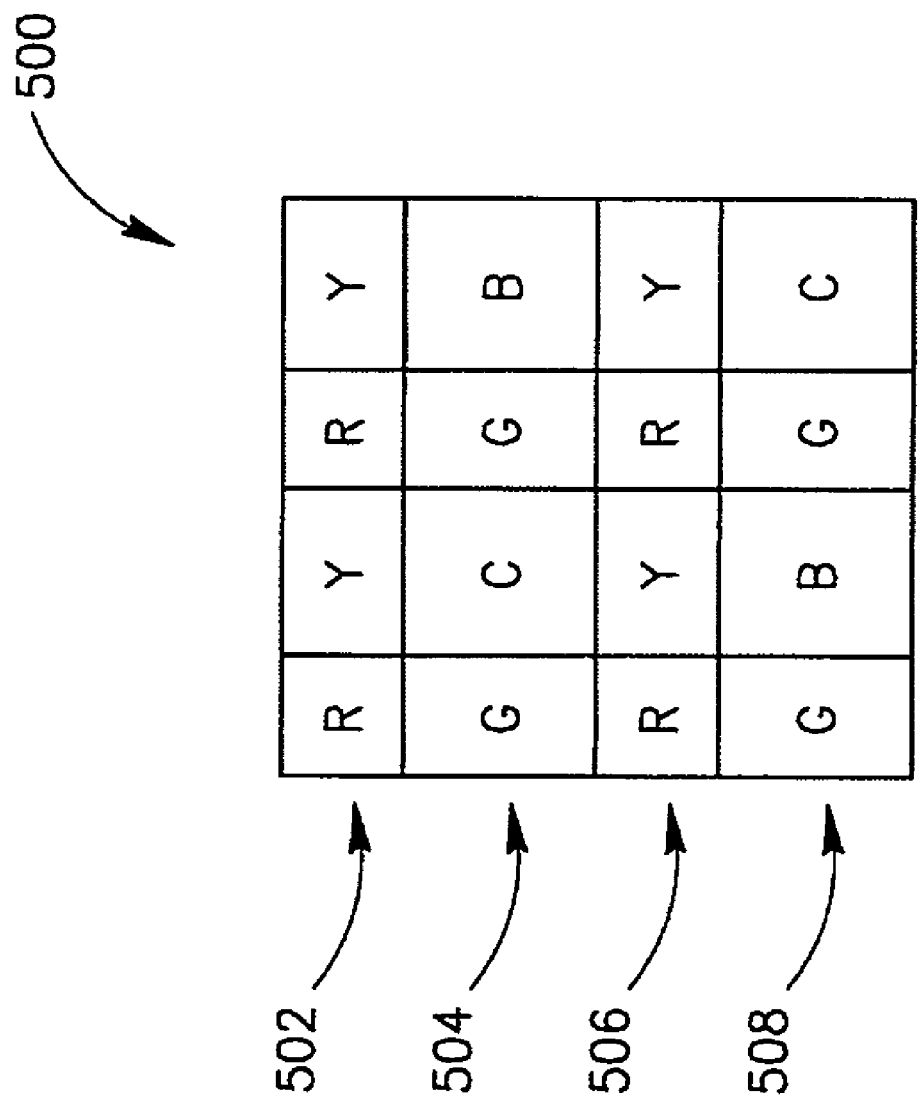
FIG. 5 is a schematic illustration of a pattern of sub-pixel elements, which may be implemented to form a sub-pixel configuration in accordance with additional exemplary embodiments of the invention.

Reference is also made to FIG. 5, which schematically illustrates a 5-primary pattern 500 of sub-pixel elements, which may be implemented to form a sub-pixel configuration according to other exemplary embodiments of the invention.

Pattern 500 may include four rows, e.g., row 502, row 504, row 506, and row 508. Row 520 and row 506 may be identical and may each include a 2-primary sequence, for example, a sequence "red-yellow-ted-yellow". Row 504 and row 508 may include a 3-primary sequence, e-g., "green-cyan-green-blue" and a 3-primary sequence, e.g., "green-blue-green-cyan", respectively. It will be appreciated by those skilled in the art that a pattern, e.g., pattern 500, wherein the location of the cyan and blue primary colors is interchanged along the columns, may be implemented to achieve a more uniform color distribution across the display.

Some exemplary embodiments of the invention, e.g., as are described above, may relate to a controller, e.g., controller 118 (FIG. 1) able to provide a driver of a sub-pixel element corresponding to the cyan primary color with a value determined based on a combination of sub-pixel data corresponding to the cyan primary color of two or more pixels, and/or to provide a driver of a sub-pixel element corresponding to the blue primary color with a value determined based on a combination of sub-pixel data corresponding to the blue primary color of two or more pixels. However, other exemplary embodiments of the invention may include a controller, e.g., controller 118 (FIG. 1) able to provide the drivers of one or more sub-pixel elements with a value determined based on any other desired combination of sub-pixel data of one or more pixels, e.g., as described below.

According to some embodiments of tie invention, controller 118 (FIG. 1) may be able to provide drivers, e.g., drivers 120 (FIG. 1), corresponding to sub-pixel elements of at least first and second color sequences, e.g., as are described above, based on sub-pixel data corresponding to at least first and second pixels of the color image. Controller 118 (FIG. 1) may be able, for example, to activate at least one sub-pixel element of at least one of the first and second sequences, based on a value determined by a combination of sub-pixel data of at least the first and second pixels, as described below.

According to some exemplary embodiments of the invention, controller 118 (FIG. 1) may be able to activate a sub-pixel element of the first/second sequence based on a value determined by a combination of sub-pixel data of the sub-pixel element to be activated and the primary color not included in the first/second sequence. For example, controller 118 (FIG. 1) may be able to provide the drivers of green sub-pixel elements with a value determined based on a combination of green sub-pixel data and cyan sub-pixel data of a pixel; and/or to provide the drivers of blue sub-pixel elements with a value determined based on a combination of blue sub-pixel data and cyan sub-pixel data of a pixel. Alternatively or additionally controller 118 may be able to provide the drivers of cyan sub-pixel elements with a value determined based on a combination of blue sub-pixel data and cyan sub-pixel data of a pixel; and/or to provide the drivers of red sub-pixel elements with a value determined based on a combination of blue sub-pixel data and red sub-pixel data of a pixel.

In some embodiments, the green, blue and cyan primaries of a display, e.g., display 100 (FIG. 1) may be represented by predetermined green, blue and cyan primary color vectors in the XYZ color space, denoted, $\vec{P}_G$, $\vec{P}_B$, and $\vec{P}_C$, respectively.

According to some exemplary embodiments of the invention, a combination, e.g., a linear combination, of the green and blue primary color vectors, may be implemented to produce a color approximately equivalent or comparable to the cyan primary color. A desired linear combination may be determined, for example, using the following equation:

$$\vec{P}_c \approx \beta \vec{P}_B + \gamma \vec{P}_G \quad (4)$$

wherein β and γ denote parameters relating to the linear contributions of the blue and green primary colors, respectively. It will be appreciated that the linear combination according to Equation 4 may be used to reproduce a color equivalent to the cyan primary color, e.g., if the chromaticity value of the cyan primary color is located on a line connecting the chromaticity values of the green and blue primary colors, or comparable to the cyan primary color, e.g., if the chromaticity value of the cyan primary color is located off but relatively proximal to the line connecting the chromaticity values of the green and blue primary colors.

As described above, some pixels of display 100 may be reproduced by a plurality of sub-pixel elements not including a blue sub-pixel element ("non-blue sub-pixel elements"), and/or some pixels may be reproduced by a plurality of sub-pixel elements not including a cyan sub-pixel ("non-cyan sub-pixel elements"). According to exemplary embodiments of the invention, controller 118 (FIG. 1) may be able to provide the drivers of one or more non-cyan sub-pixel elements with a value determined based on cyan sub-pixel data. For example, controller 118 (FIG. 1) may provide the drivers of blue and/or green sub-pixel elements for reproducing a pixel with signals B' and G', respectively, e.g., according to the following equation set:

$$B'=B+C\cdot\beta$$
$$G'=G+C\cdot\gamma \quad (5)$$

wherein B, G, and C denote the blue, green and cyan image components of the pixel to be reproduced. According to some exemplary embodiments of the invention, the values of one or both of B' and/or G' may be "clipped", i.e., set to a maximal producible value of the blue and green primary colors, respectively, e.g., if the values of B' and/or G' calculated according to Equation 5 exceed the maximal producible value of the blue and/or green primary colors, respectively.

It will be appreciated by those skilled in the art, that activating blue and/or green sub-pixel elements based on cyan sub-pixel data may improve the perceived spatial resolution of the cyan primary color and/or reduce a perceived luminance variation between a pixel reproduced by non-blue sub-pixel elements and a pixel reproduced by non-cyan sub-pixel elements.

According to some exemplary embodiments of the invention, it may be desired to reduce a color shift, e.g. a cyan color shift, which may result, for example, from activating one or more non-cyan sub-pixel elements based on a value determined by cyan sub-pixel data. Such a color shift may be reduced, according to some exemplary embodiments of the invention, by activating a blue sub-pixel element, e.g., of a first color sequence, based on a corrected value determined by a combination, e.g., a sum, of blue sub-pixel data of a first pixel and a blue correction component, $\Delta B$; activating a green sub-pixel element, e.g., of the first color sequence, based on a corrected value determined by a combination, e.g., a sum, of green sub-pixel data of the first pixel and a green correction component, $\Delta G$; and activating a cyan sub-pixel element, for example, of a second color sequence, e.g., adjacent to the first color sequence, based on a corrected value determined by a combination of, e.g., a difference between, cyan sub-pixel data of a second pixel and a cyan correction component, $\Delta C$, as described below.

According to some exemplary embodiments of the invention, the correction components $\Delta C$, $\Delta B$, and $\Delta G$ may be determined such that the luminance of the cyan primary color reproduced by the cyan sub-pixel element is substantially equal to the sum of the luminance of the blue primary color reproduced by the blue sub-pixel element and the luminance of the green primary color resulting from the green correction component $\Delta G$. Additionally, it may be desired that the amount of the cyan color resulting from the cyan correction component $\Delta C$, will be substantially equal to the amount of a cyan-equivalent color reproduced by the green and blue sub-pixel elements, e.g., the sum of the amount of blue color resulting from the blue correction component, $\Delta B$, and the amount of the green color resulting from the green correction component, $\Delta G$. For example, the correction components may be determined using the following equations:

$$(C-\Delta C)\cdot Y_C = (B+\Delta B)\cdot Y_B + \Delta G \cdot Y_G \quad (6)$$

$$\Delta C \cdot \vec{P}_C = \Delta B \cdot \vec{P}_B + \Delta G \cdot \vec{P}_G \quad (7)$$

wherein $Y_C$, $Y_B$, and $Y_G$ denote the luminance of the cyan, blue and green primary colors.

Substituting Equation 4 in Equation 7 and re-arranging terms may yield the following equations:

$$\Delta B = \beta \Delta C \quad (8)$$

$$\Delta G = \gamma \Delta C \quad (9)$$

Substituting Equations 8 and 9 in Equation 6 and rearranging terms may yield the following equation:

$$\Delta C = \frac{C\cdot Y_C - B\cdot Y_B}{Y_C + \beta\cdot Y_B + \gamma\cdot Y_G} \quad (10)$$

According to exemplary embodiments of the invention, controller 118 (FIG. 1) may determine a value for the cyan correction component $\Delta C$, e.g., by substituting in Equation 10 the primary color luminance values $Y_C$, $Y_B$, and $Y_G$, predefined parameters $\beta$ and $\gamma$, and the cyan and a value corresponding to the blue sub-pixel data of the first pixel. Controller 118 may additionally determine a value for the blue correction component $\Delta B$ and/or a value for the green correction component $\Delta G$, e.g., using Equations 8 and 9. Controller 118 may provide the blue, green and cyan sub-pixel elements with corrected values, e.g., based on the correction components $\Delta B$, $\Delta G$, and $\Delta C$, e.g., as described above.

According to some exemplary embodiments of the invention, the corrected value provided to the blue sub-pixel and/or the corrected value provided to the green sub-pixel may be clipped, e.g., if the corrected value provided to the blue sub-pixel element and/or the corrected value provided to the green sub-pixel element exceed the maximal producible value of the blue and/or green primary colors, respectively.

Some exemplar embodiments of the invention, e.g., as are described above, relate to activating green and/or blue sub-pixel elements based on cyan sub-pixel data; and/or activating green, blue and/or cyan sub-pixel elements based on corrected values. However, other embodiments of the invention may analogously be implemented for activating one or more other sub-pixel elements, e.g., a cyan sub-pixel element or cyan and red sub-pixel elements, based on other sub-pixel data, e.g., blue sub-pixel data; and/or activating other sub-pixel elements, e.g., cyan red and blue sub-pixel elements, based on corrected values. For example, in other embodiments, one or more sub-pixel elements may be activated based on any suitable combination of sub-pixel data of one or more pixels, e.g., a combination corresponding to a spatial function of one or more pixels.

Although some of the exemplary devices, systems and/or methods described above are described in the context of devices for reproducing five primary colors, it will be appreciated by those skilled in the art, that similar devices, systems and/or methods may be implemented, with appropriate changes, in conjunction with devices for reproducing more or less than five primary colors.

While certain features of the invention have been illustrated and described herein, many modifications, substitutions, changes, and equivalents will now occur to those of ordinary skill in the art It is, therefore, to be understood that the appended claims are intended to cover all such modifications and changes as fall within the true spirit of the invention.

The invention claimed is:

1. A color display device comprising an array of sub-pixel elements of at least four different colors arranged in first and second sequences each including a plurality of sub-pixel elements, wherein at least one of said at least four different colors occurs in each of said first and second sequences, wherein said first color sequence includes at least one sub-pixel element of a color not included in said second sequence, and wherein said first and second sequences repeat alternatingly to substantially fill each row of sub-pixels.

2. The display device of claim 1, comprising a controller able to selectively activate at least some sub-pixel elements of said array to produce one or more attenuation patterns based on sub-pixel data representing pixels of said color image.

3. The display device of claim 2, wherein said controller is able to activate sub-pixel elements of said first and second color sequences based on sub-pixel data corresponding to at least first and second pixels of said color image.

4. The display device of claim 3, wherein said controller is able to activate at least one sub-pixel element of at least one of said first and second sequences, based on a value determined by a combination of sub-pixel data of said at least first and second pixels.

5. The display device of claim 4, wherein said at least one sub-pixel element to be activated comprises the sub-pixel element of the color not included in said second sequence, and wherein said sub-pixel data comprises sub-pixel data of said at least first and second pixels corresponding to the color not included in said second sequence.

6. The display device of claim 3, wherein said controller is able to activate a sub-pixel element of said second sequence based on a value determined by a combination of sub-pixel data of the sub-pixel element to be activated and the color not included in said second sequence.

7. The display device of claim 6, wherein said controller is able to activate a green sub-pixel element of said second sequence based on a value determined by a combination of green and cyan sub-pixel data of said second pixel.

8. The display device of claim 6, wherein said controller is able to activate a blue sub-pixel element of said second sequence based on a value determined by a combination of blue and cyan sub-pixel data of said second pixel.

9. The display device of claim 6, wherein said controller is able to activate a cyan sub-pixel element of said second sequence based on a value determined by a combination of blue and cyan sub-pixel data of said second pixel.

10. The display device of claim 3, wherein said controller is able to:

activate a first sub-pixel element of said second sequence based on a value determined by a combination of sub-pixel data of said second pixel corresponding to the color of said first sub-pixel element, and a first correction component;

activate a second sub-pixel element of said second sequence based on a value determined by a combination of sub-pixel data of said second pixel corresponding to the color of said second sub-pixel element, and a second correction component; and activate the sub-pixel element of the color not included in said second sequence based on a value determined by a combination of sub-pixel data of said first pixel corresponding to the color not included in said second sequence, and a third correction component.

11. The display device of claim 10, wherein said controller is able to determine at least one of said first, second and third correction components based on a relation between the luminance reproduced by said first sub-pixel element, said second sub-pixel element and the sub-pixel element of the color not included in said second sequence.

12. The display device of claim 11, wherein said controller is able to determine at least one of said first, second and third correction components such that a value corresponding to the luminance reproduced by the sub-pixel element of the color not included in said second sequence is substantially equal to the sum of the luminance reproduced by said first and second sub-pixel elements.

13. The display of claim 10, wherein said first and second sub- pixel elements comprise green and blue sub-pixel elements, and wherein the sub-pixel element of the color not included in said second sequence comprises a cyan sub-pixel element.

14. The display device of claim 1, wherein said second color sequence includes at least one sub-pixel element of a color not included in said first sequence.

15. The display device of claim 1, wherein said at least four different colors comprise at least five colors.

16. The display device of claim 15, wherein said at least five colors comprise red, yellow, green, cyan and blue.

17. The display device of claim 1, wherein the sub-pixel elements of said array are arranged in a repeatable pattern including sub-pixel elements of each of said at least four colors, said pattern including less sub-pixel elements of a first color than sub-pixel elements of a second color.

18. The display device of claim 17, wherein said at least four colors comprise at least five colors, wherein said repeatable pattern includes sub-pixel elements of blue, cyan, green, red and yellow colors, and wherein the number of blue and cyan sub-pixel elements in said pattern is smaller than the number of green, red and yellow sub-pixel elements in said pattern.

19. The display device of claim 17, wherein said pattern comprises eight sub-pixel elements.

20. The display device of claim 19, wherein said eight sub-pixel elements are arranged in one row.

21. The display device of claim 20, wherein said sub-pixel elements are arranged in the order red-yellow-green-cyan-red-yellow-green-blue.

22. The display device of claim 19, wherein said pattern comprises two adjacent rows of four sub-pixel elements.

23. The display device of claim 22, wherein said pattern comprises a row of sub-pixel elements arranged in the order green-cyan-green-blue, and an adjacent row of sub-pixel elements arranged in the order red-yellow-red-yellow.

24. The display device of claim 17, wherein said pattern comprises sixteen sub-pixel elements.

25. The display device of claim 24, wherein said sixteen sub-pixel elements are arranged in first and second adjacent rows, each row including eight of said sub-pixel elements.

26. The display device of claim 25, wherein sub-pixel elements of said first row are arranged in the order yellow-green-red-cyan-yellow-green-re-d-blue, and sub-pixel elements of said second row are arranged in the order yellow-green-red-blue-yellow-green-red-cyan.

27. The display device of claim 25, wherein sub-pixel elements of said first row are arranged in the order red-yellow-green-cyan-red-yellow-green-blue, and sub-pixel elements of said second row are arranged in the order red-yellow-green-blue-red-yellow-green-cyan.

28. The display device of claim 24, wherein said sixteen sub-pixel elements are arranged in four adjacent rows, each including four of said sub-pixel elements.

29. The display device of claim 28, wherein sub-pixel elements of each of the first and third rows of said pattern are arranged in the order red-yellow-red-yellow, wherein sub-pixel elements of the second row of said pattern are arranged in the order green-cyan-green-blue, and wherein sub-pixel elements of the fourth row of said pattern are arranged in the order green-blue-green-cyan.

30. The display device of claim 1, wherein said first sequence is adjacent to said second sequence.

31. The display device of claim 1, wherein at least one of said color sequences comprises sub-pixel elements of at least four colors.

32. The display device of claim 31, wherein at least one of said first and second color sequences includes a sub-sequence of sub-pixel elements of three or more colors.

33. The display device of claim 32, wherein said sub-sequence comprises green, red and yellow sub-pixel elements.

34. The display device of claim 1, wherein at least a first color and a second color repeat in said array of sub-pixel elements in first and second different frequencies, respectively.

35. A method comprising selectively activating at least some sub-pixel elements of an array of sub-pixel elements to produce one or more attenuation patterns based on sub-pixel data representing pixels of said color image,
wherein said array comprises sub-pixel elements of at least four different colors arranged in first and second sequences of three or more sub-pixel elements, wherein at least one of said at least four different colors occurs in each of said first and second sequences, wherein said first color sequence includes at least one sub-pixel element of a color not included in said second sequence, and wherein said first and second sequences repeat alternatingly to substantially fill each row of sub-pixels.

36. The method of claim 35, comprising activating sub-pixel elements of said first and second color sequences based on sub-pixel data corresponding to at least first and second pixels of said color image.

37. The method of claim 36 comprising activating at least one sub-pixel element of at least one of said first and second sequences, based on a value determined by a combination of sub-pixel data of said at least first and second pixels.

38. The method of claim 37, wherein said at least one sub-pixel element to be activated comprises the sub-pixel element of the color not included in said second sequence, and wherein said sub-pixel data comprises sub-pixel data of said at least first and second pixels corresponding to the color not included in said second sequence.

39. The method of claim 36 comprising activating a sub-pixel element of said second sequence based on a value determined by a combination of sub-pixel data of the sub-pixel element to be activated and the color not included in said second sequence.

40. The method of claim 39 comprising activating a green sub-pixel element of said second sequence based on a value determined by a combination of green and cyan sub-pixel data of said second pixel.

41. The method of claim 39, comprising activating a blue sub-pixel element of said second sequence based on a value determined by a combination of blue and cyan sub-pixel data of said second pixel.

42. The method of claim 39, comprising activating a cyan sub-pixel element of said second sequence based on a value determined by a combination of blue and cyan sub-pixel data of said second pixel.

43. The method of claim 36 comprising:
activating a first sub-pixel element of said second sequence based on a value determined by a combination of sub-pixel data of said second pixel corresponding to the color of said first sub-pixel element, and a first correction component;
activating a second sub-pixel element of said second sequence based on a value determined by a combination of sub-pixel data of said second pixel corresponding to the color of said second sub-pixel element, and a second correction component; and
activating the sub-pixel element of the color not included in said second sequence based on a value determined by a combination of sub-pixel data of said first pixel corresponding to the color not included in said second sequence, and a third correction component.

44. The method of claim 43 comprising determining at least one of said first, second and third correction components based on a relation between the luminance reproduced by said first sub-pixel element, said second sub-pixel element and the sub-pixel element of the color not included in said second sequence.

45. The method of claim 44 comprising determining at least one of said first, second and third correction components such that a value corresponding to the luminance reproduced by the sub-pixel element of the color not included in said second sequence is substantially equal to the sum of the luminance reproduced by said first and second sub-pixel elements.

46. The method of claim 43, wherein said first and second sub-pixel elements comprise green and blue sub-pixel elements, and wherein the sub-pixel element of the color not included in said second sequence comprises a cyan sub-pixel element.

47. The method of claim 35, wherein said at least four different colors comprise at least five colors.

48. The method of claim 47, wherein said at least five colors comprise red, yellow, green, cyan and blue.

49. The method of claim 35, wherein at least one of said color sequences comprises sub-pixel elements of at least four colors.

50. The method of claim 35, wherein at least a first color and a second color repeat in said array of sub-pixel elements in first and second different frequencies, respectively.

* * * * *